July 2, 1968   M. C. CROCKER II, ETAL   3,390,848
MAGNETIC TORQUING OF SPIN AXIS STABILIZATION
Filed May 19, 1966

INVENTORS
MILLERD CHANDLER CROCKER II
EDWARD A. VRABLIK
BY Harry A. Herbert Jr. and
Sherman H. Goldman
ATTORNEYS

United States Patent Office 3,390,848
Patented July 2, 1968

3,390,848
MAGNETIC TORQUING OF SPIN AXIS STABILIZATION
Millerd Chandler Crocker II, Lexington, and Edward A. Vrablik, Acton, Mass., assignors to the United States of America as represented by the Secretary of the Air Force
Filed May 19, 1966, Ser. No. 551,867
3 Claims. (Cl. 244—1)

ABSTRACT OF THE DISCLOSURE

A spin stabilized satellite wherein the spin vector of the satellite is maintained perpendicular to the solar vector by means of two sets of solar cells mounted externally on the satellite and connected with a coil oriented parallel to the spin axis such that a difference current between the sets of solar cells reacts with the earth's magnetic field and produces a magnetic moment to precess the satellite to the desired orientation.

---

This invention relates generally to means for orienting a spin stabilized satellite such that the spin vector will be oriented and maintained perpendicular to the solar vector and, more particularly, to a magnetic torquing device which is capable of producing a magnetic moment to interact with the earth's geomagnetic field without requiring high power consumption.

The device basically comprises two sets of solar cells each feeding coils capable of producing a magnetic moment which interacts with the earth's geomagnetic field in order to bring the satellite into appropriate orientation. Included within the invention and deemed to be a part thereof is the utilization of cores of very soft magnetic material such as Supermendur which increases the satellite magnetic moment without increasing the power consumption or weight of the device.

Orbital satellites are often used for scientific study purposes and generally are spin stabilized in order to allow samplings of various orientations. Comparisons of the various views may be effected and the appropriate information separated from background signals.

The orientation of the spinning satellite is important in order to assure proper functioning of the equipment required to obtain scientific data. Orientation also allows equalization of satellite skin temperatures which produces an increase in solar cell efficiency. By precessing the satellite spin vector perpendicular to the solar vector and maintaining it in that position with the magnetic torquing system of this invention, external commands for achieving the orientation may be eliminated. Satellites requiring long life without conventional batteries are able to utilize this particular orientation since it provides temperature balance favorable to power conversion for a high area thermal-mass ratio satellite.

Accordingly, it is a primary object of this invention to provide a magnetic torquing device for orientation of a spin stabilized satellite.

It is another object of this invention to orient a spin stabilized satellite with its spin vector perpendicular to the solar vector.

It is still another object of this invention to provide a magnetic torquing device for solar orientation of a spin stabilized satellite which provides higher magnetic moments than that heretofore achieved without an attendant increase in power consumption or weight.

Another object of this invention involves the provision of a magnetic torquing device for orientation of a spin stabilized satellite which does not require magnetometer signals and complex circuitry for determining orientation.

These and other advantages, features and objects of the invention will become more apparent from the following description taken in connection with the illustrative embodiments in the accompanying drawings, wherein.

Figure 1:
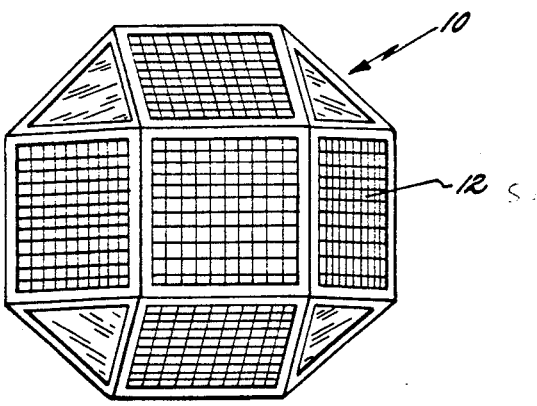
FIGURE 1 is a pictorial representation of the satellite.

The satellite 10 illustrated in FIGURE 1 comprises a 26 sided polyhedron with solar cell panels 12 covering all of the square faces. The satellite has eighteen panels 12 with eight of them being provided in an equatorial belt around the spin axis. Five panels are provided above the equatorial belt and an additional five are provided below the equatorial belt. With eighteen panels utilized, all of those above the equatorial belt and one-half, or four of the alternate panels on the equatorial belt, are connected in parallel, while the remaining panels are similarly connected together in parallel. Thus, current from the first-mentioned connected set of panels may be designated as having current the total output of which is $I_{upper}$ with the output of the panels being designated $I_{lower}$. When multiturn air core coils are utilized for providing a magnetic moment for orientation of the satellite, the $I_{upper}$ current and the $I_{lower}$ current would be routed in opposite directions. Thus, a magnetic moment proportional to their difference is produced.

Figure 2:
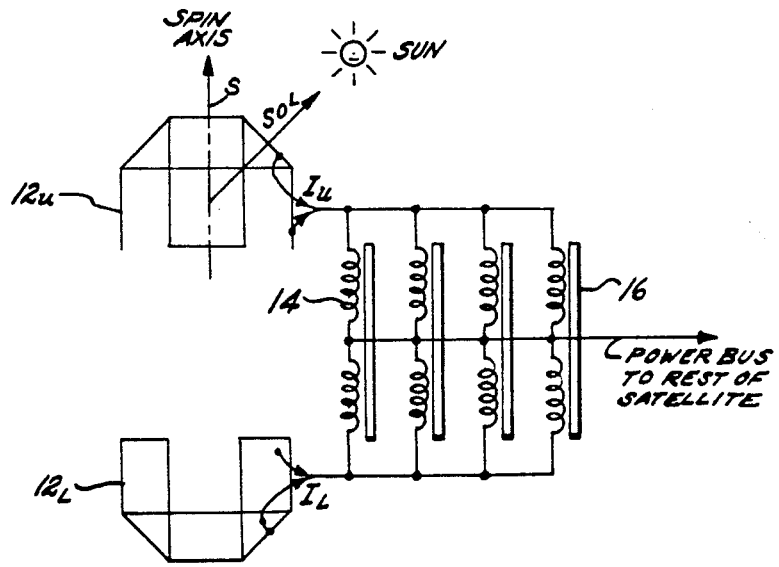
FIGURE 2 is a schematic representation of the magnetic orientation system.

As can be seen in FIGURE 2, the solar panels $12_U$ and $12_L$ are connected to coils 14. The difference current $\Delta I$ may be written in vector form as the dot product of the unit vector along the spin axis S and the sun vector SOL. The magnetic moment M produced by this difference current is proportional to the area of the coils 14 and the number of turns N in each coil; the magnetic moment being directed along the spin axis.

The coils 14 are in series with the solar panels 12 and the main satellite power bus. In order to avoid the conversion of the solar panel current into heat in the coils, they must have very low resistance otherwise power for operation of the equipment in the satellite would not be available.

The maximum magnetic moment capable of being created with an air core system for a particular sized satellite may be calculated to be approximately 2 amp-m.$^2$. This invention contemplates the utilization of a core of very soft magnetic material with high intrinsic magnetization in order to provide an increase in the magnetic moment without an increase in power consumption or weight. Four electromagnetic coils as shown in FIGURE 2 having Supermendur cores 16 which are properly wound and spaced are capable of producing a magnetic moment of up to 29 amp-m.$^2$. The magnetic moment would no longer be linear with respect to the change in current and would be found from the B–H curve of Supermendur and the past values of $\Delta I$.

In a satellite which was constructed and tested the solar cells were capable of producing 16 volts with 1.4 amperes. The coil power consumption was limited to 1% of the total power available, therefore, the voltage drop was required to be less than .16 volt, when all of the current (1.4 amperes) flowed through a single coil. Thus, the coil resistance is limited to .12 ohm. With a satellite weight of 50 pounds and allowing only one pound for orientation experimentation, the coil arrangement would be limited to an area of .29 m.$^2$ by the size of the satellite which in this case was 24 inches across faces. The weight resistance and coil size restrictions limited the number of turns to about five of the aluminum wire.

Four electromagnetic coils .114 inch in diameter and 23 inches long properly wound and spaced are capable of producing a theoretical maximum moment of 29 amp-m.$^2$ with Supermendur cores. The use of the high permeability core causes the variation of magnetic moment no longer to be proportional to the number of turns and theory of the coil but now is multi-valued and nonlinear with respect to $\Delta I$. The torque produced by the interaction of the magnetic moment with the earth's magnetic field is equal to the satellite angular momentum.

When the top and bottom panels, which are normal to the spin axis, are connected to the torquing coil such that a plane through the turns of the coil is also normal to the spin axis, illumination which falls thereon is fed into the coil which precesses the spin axis around the magnetic field lines until it is approximately normal to the sun, at which time the power is automatically shutoff since the top panel is no longer illuminated.

Thus, there has been shown a torquing device for orienting a satellite vehicle without the use of cumbersome equipment and circuitry.

Although the invention has been described with reference to a particular embodiment, it will be understood to those skilled in the art that the invention is capable of a variety of alternative embodiments within the spirit and scope of the appended claims. For example, the size and limitations of the example are intended to be illustrative only and not restrictive.

We claim:
1. A magnetic torquing means for a spin stabilized satellite to maintain the spin vector of the satellite perpendicular to the solar vector comprising:
   a first set of solar cells mounted externally on said satellite below its equatorial belt,
   a second set of solar cells mounted externally on said satellite above its equatorial belt,
   a coil mounted within said satellite, said coil being oriented such that a plane through each turn of the coil is normal to the spin axis of the satellite, and
   means connecting said first and second sets of solar cells to said coil such that the difference current between said sets of solar cells reacts with the earth's magnetic field and produces a magnetic moment to precess the satellite spin vector a position perpendicular to the solar vector.

2. Means as defined in claim 1 including a core within said coil, said core being of a soft magnetic material with high intrinsic magnetization.

3. Means as defined in claim 1 including multiple coils connected with said first and second sets of solar cells.

References Cited

UNITED STATES PATENTS

| | | | |
|---|---|---|---|
| 3,228,628 | 1/1966 | Chubb | 244—1 |
| 3,302,905 | 2/1967 | Davis et al. | 244—1 |

FERGUS S. MIDDLETON, *Primary Examiner.*